United States Patent [19]

Kupfernagel et al.

[11] Patent Number: 5,018,687
[45] Date of Patent: May 28, 1991

[54] DOOR/HATCH ACTUATION

[75] Inventors: Artur Kupfernagel, Stuhr; Dieter Nitsch, Delmenhorst, both of Fed. Rep. of Germany

[73] Assignee: MBB GmbH, Bremen 1, Fed. Rep. of Germany

[21] Appl. No.: 317,659

[22] Filed: Mar. 1, 1989

[30] Foreign Application Priority Data

Mar. 2, 1988 [DE] Fed. Rep. of Germany ....... 3806688

[51] Int. Cl.5 .............................................. B64C 1/14
[52] U.S. Cl. .................................. 244/129.5; 49/339; 49/344; 16/369; 16/78
[58] Field of Search .......................... 244/129.5, 118.1; 49/339, 340, 344; 16/369, 370, 78

[56] References Cited

U.S. PATENT DOCUMENTS

| 1,716,707 | 6/1929 | Schoelkopf | 49/340 |
| 4,429,491 | 2/1984 | Bruns | 49/344 |
| 4,479,622 | 10/1984 | Howse | 244/129.5 |
| 4,510,714 | 4/1985 | Kasper et al. | 244/129.5 |

FOREIGN PATENT DOCUMENTS 3126788 1/1983 Fed. Rep. of Germany ........ 49/340

Primary Examiner—Joseph F. Peters, Jr.
Assistant Examiner—Christopher P. Ellis
Attorney, Agent, or Firm—Ralf H. Siegemund

[57] ABSTRACT

A mechanically operable actuating device for opening towards the outside and closing a cargo hatch or freight door in the fuselage of an aircraft comprises two hinges for connecting an upper side of the door or hatch to the fuselage; a first swivel joint floatingly mounts the upper end of a coupling member to a reenforcing part in the upper portion of the hatch or door; a second swivel joint floatingly connects a rocking arm to a hatch or door frame of the fuselage; a third swivel joint connects the rocking arm to the lower end of the coupling member; a fourth swivel joint connects one end of a gas pressure spring to the rocking arm so that the spring extends substantially parallel to the coupling member; and a fifth swivel joint connects an opposite end of the spring also to the upper end of the coupling member.

6 Claims, 5 Drawing Sheets

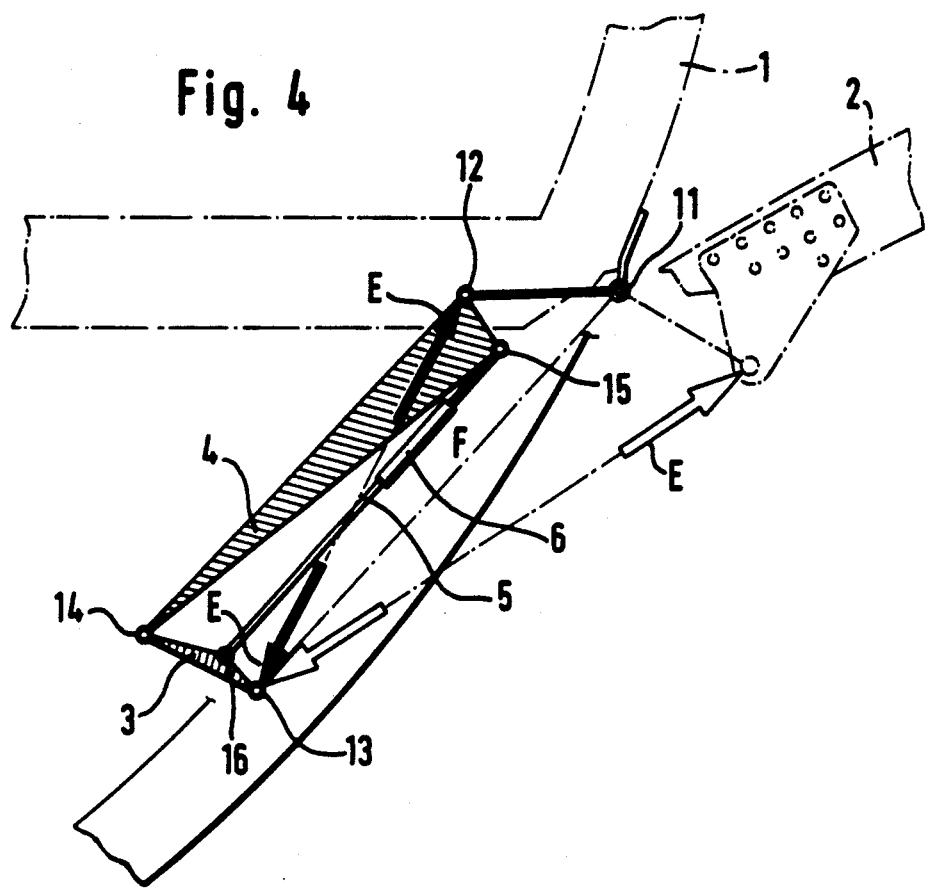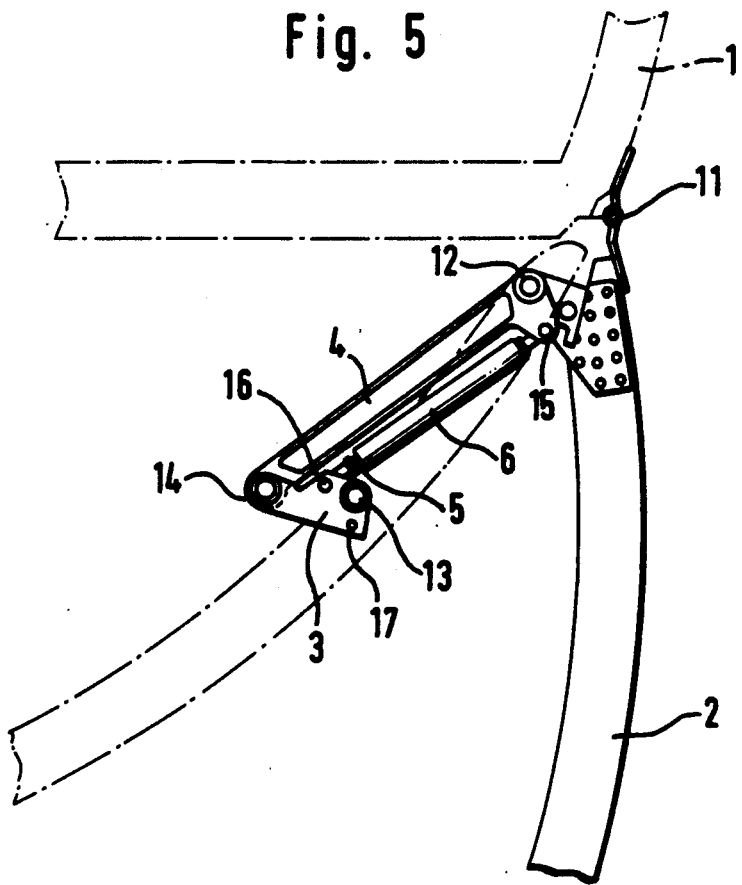

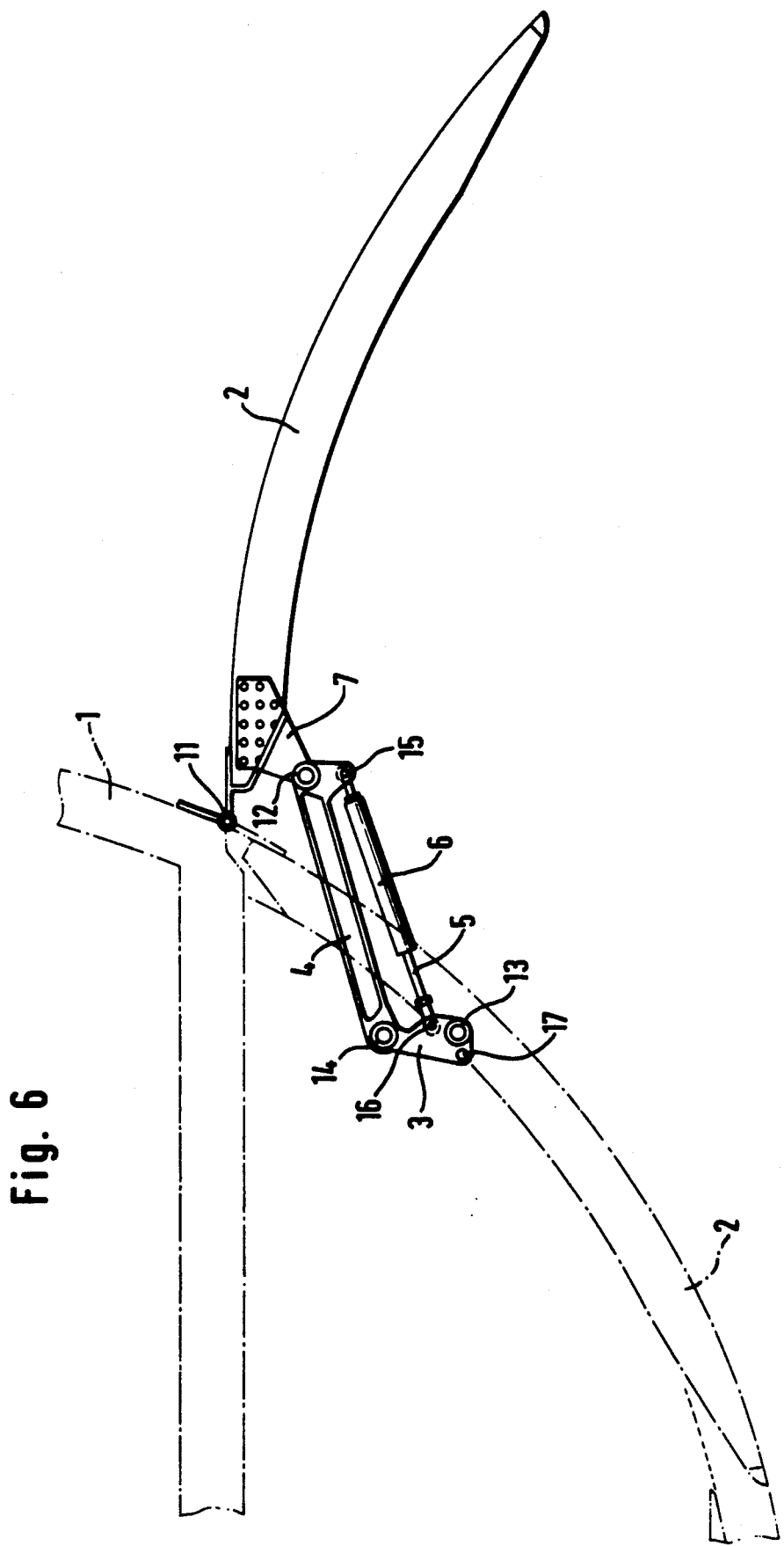

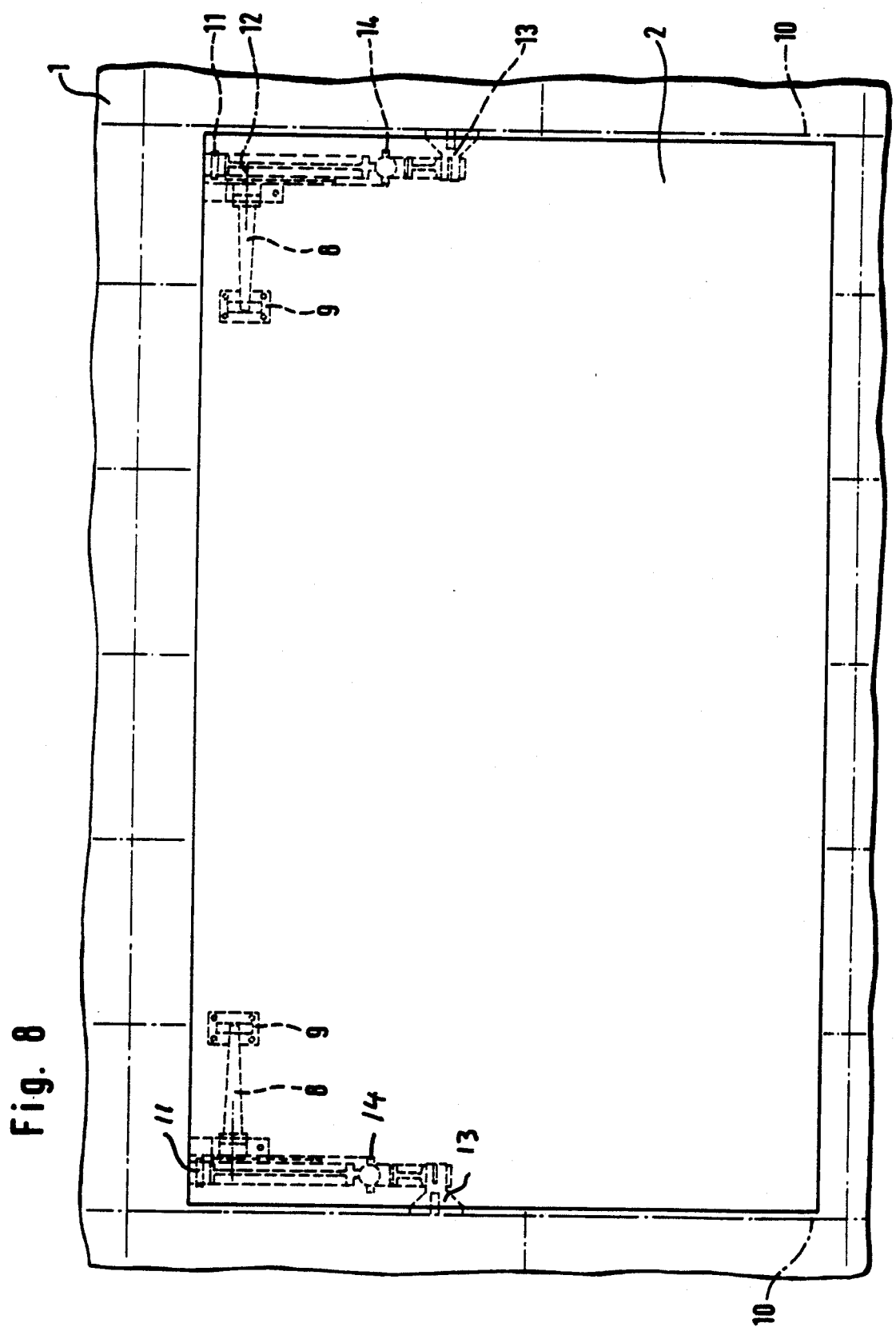

DOOR/HATCH ACTUATION

BACKGROUND OF THE INVENTION

The present invention relates to a device, equipment and apparatus for mechanically operating a cargo hatch or baggage or freight door in an aircraft particularly for swinging it open and out.

Freight hatches, cargo doors and hatches of the kind to which the invention pertains are usually quite large and, relatively speaking, quite heavy. It is therefore customary to use electromotors for opening them and closing them. For example, European patent 105082 and PCTWO84/01761 suggest devices for operating freight hatches, and cargo doors in aircraft wherein, under utilization of an electromotor lever linkage causes the hatch, gate or door to be forced out of the fuselage and up, for opening same. Such electromotor driven opening devices and structures have offered the advantage that any manual power and energy is not needed for opening the hatch door or gate in an automatic fashion. Of course devices of this kind are inherently disadvantaged by the fact that they depend on a functioning and operating electric power supply. Moreover, as compared with strictly mechanical opening and closing devices for such doors and hatches, motor driven devices are relatively heavy. Inherent of course in the automation is also that they are prone to breakdown. That in turn requires additional drives possibly redundancy, monitoring control structure and so forth.

U.S. Pat. No. 4,601,446 describes a manually operated opening device and structure for cargo hatches whereby however the gate or door opens into the interior of the craft. A spring guided and biased weight balancing and compensating mechanism insures that opening and closing of the hatches is fairly easy. Also a certain attenuation is provided for to make sure that particularly closing of the gate is attenuated towards a more or less gentle final closing stage.

Mechanical devices of this kind are disadvantaged by a very complex mechanism as far as adjustment and actuation is concerned. Moreover, this particular mechanism is suitable only for opening the gate towards the inside and not for having it swing out. The path involved is totally different. Similar disadvantages are offered by the somewhat older U.S. Pat. No. 3,773,311 for the access door to baggage space and compartments in aircraft. Also here a spring attenuating system makes sure that the inwardly opening gate is movable at a constant actuating force.

Finally German printed patent application 3,608,735 (corresponding to U.S. Pat. No. 4,787,578) is mentioned wherein a mechanically actuated opening device is provided for a freight hatch which swings inwardly. Opening structure has a torsion rod which is capable of taking up the weight of the gate over the entire range.

DESCRIPTION OF THE INVENTION

It is an object of the present invention to provide a new and improved mechanically operable and operating opening device for cargo hatches, freight doors, baggage compartment gates and the like in aircraft which open towards the inside and which under utilization of a mechanically simply constructed actuating system permits operating personnel to fairly easily open the gate door or hatch such that on opening it only friction forces of the opening and suspension mechanisms have to be overcome.

In accordance with the preferred embodiment of the present invention it is suggested to attain the object in that the door or hatch has its upper side is linked to the fuselage by means of at least two hinges that at the upper end of the door or hatch reinforcing structure is provided to which the upper end of a coupling member is floatingly connected through a first swivel joint; a rocking arm is floatingly connected to the frame of the door or hatch in the fuselage by means of a second swivel joint; the lower end of the coupling member is connected to the rocking arm by means of a third swivel joint, a compression spring means preferably a gas pressure spring is connected with one end to the rocking member through a still further swivel joint, the compression spring runs essentially parallel to the coupling member and has its other end connected through a still further swivel joint to the upper end of the coupling member. The hatch or door can be locked through a blocking pin.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 4 is a diagram which shows acting forces for closed and open freight hatch;

FIGS. 5, 6 and 7 are cross sections through the fuselage of an aircraft, the cross section being taken in the vicinity of and including a section through a freight hatch or door with opening structure; the three figures differ in different positions of the hatch or door; and FIG. 8 shows a door or hatch with surrounding frame in top elevation and in relation to and in its connection to the fuselage.

DETAILED DESCRIPTION

Figure 1:
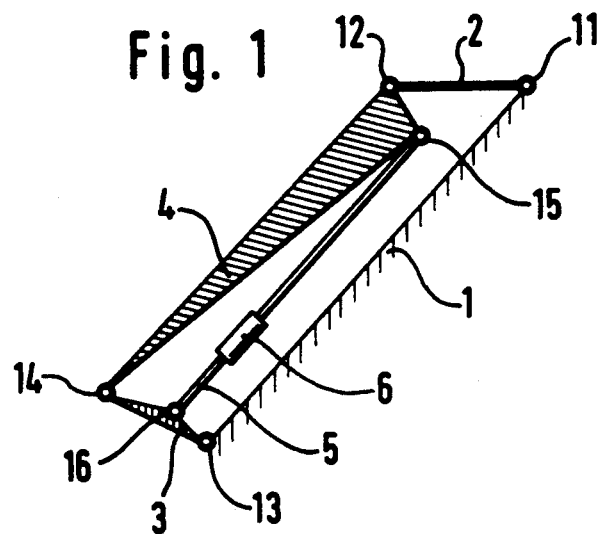
FIG. 1 is a schematic system drawing for showing the kinematics of the actuating device and structure constructed in accordance with the preferred embodiment of the present invention for practicing the best mode thereof.

Proceeding now to the detailed description of the drawings, the opening structure for a freight door, or cargo hatch requires, in accordance with the invention, a particular kinematics and drive operating mechanism which in fact can be simplified in terms of a schematic illustration to be the equivalent of six member "chain". This "chain" connects the freight door 2 with the fuselage 1, through a coupling member 4, a rocking arm 3, a mandrel 5 and a sleeve 6 pertaining to a gas compression spring. This entire "chain" is shown in FIG. 1 schematically.

Figure 2:
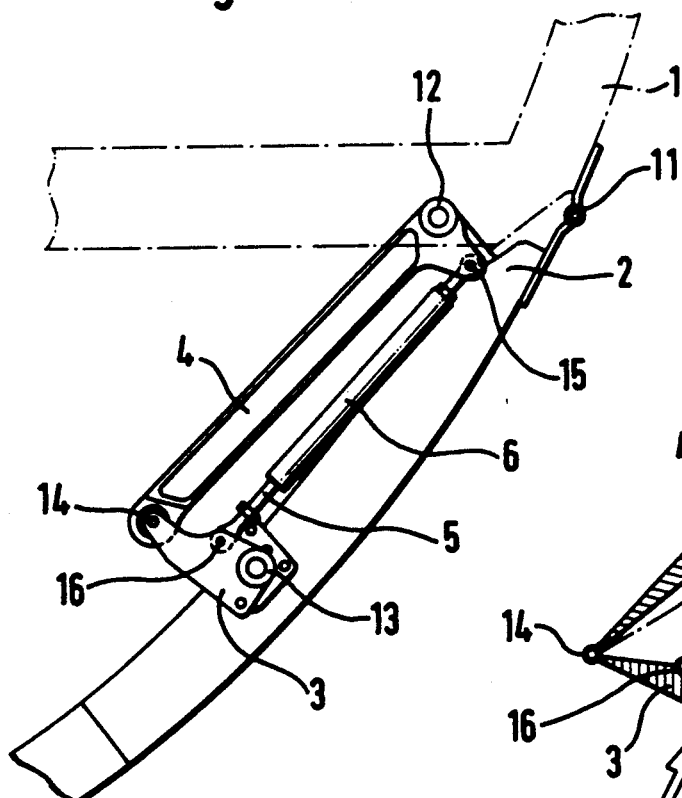
FIG. 2 is a cross section of the opening device for a closed freight hatch or door.

The connection points of the door or hatch 2 with the fuselage 1 is established by a pair of hinges 11 (see FIG. 8 for both of them). The other joints and swivel joints 12, 13, 14, 15 and 16 respectively referred to as first through fifth swivel joints and shown e.g. in FIG. 2 and others. These swivel joints are conventional design e.g. will be explained more fully below, the door 2 is connected through joints 12 to coupling member 4, while joint 13 connects the fuselage to one end of the rocking arm 3, the other end connects through joint 14 to the lower end of coupling member 4. The spring 5/6 has its upper end connected to the upper end of member 4 through joint 15 and the other end of spring 5/6 connects to arm 3 in between the joints 13 and 14.

The joint 13, one end of the "chain", is directly linked and connected to a reinforcing element 10 pertaining to the fuselage 1 and being part of the freight door and hatch frame. The full configuration of this "chain" is designed that the moment of weight in the hinge 11 and the effect of the compression spring 5/6 almost balances and compensates with regard to the effectiveness in the chain and in each disposition so that in the position "door open" as shown in FIG. 4, there is just a little excess in resilient force such that the door or hatch 2 remains firmly in position even if there is any kind of an additional wind load.

Figure 3:
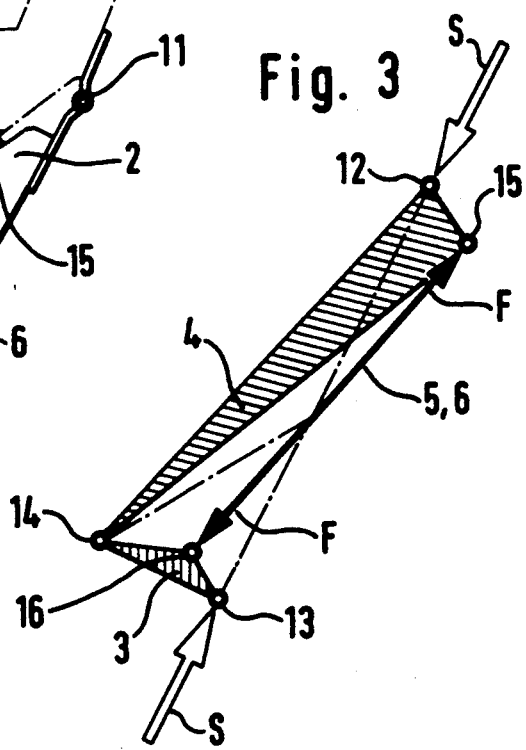
FIG. 3 shows the same diagram as FIG. 1 but with supplemental illustration of various forces acting in that system.

A partial chain is comprised of the rocking arm 3, coupling member 4 and the spring 5/6 as well as all of the joints 12, 13, 14, 15 and 16 as per FIG. 3. This partial chain is, therefore, and within the understanding of the preceding paragraph, substantially free from forces but will, owing to the compression spring 5/6, provide a momentum on account of the spring force F around the joint 14 which is supported by the supporting force S in joints 12 and 13. As a consequence the effective line of this support force S will always coincide with the connecting line between the two joints 12 and 13. Consequently the entire partial chain as defined above can be deemed to operate and function like a hypothetic spring E which is, in that form, "apparently" connected directly between the joints 12 and 13. This is shown specifically in FIG. 4. Owing to the particular selection in the disposition of the swivel joints 15 and 16 this hypothetical spring E can be modified as to its resilient effective characteristic.

Figure 7:
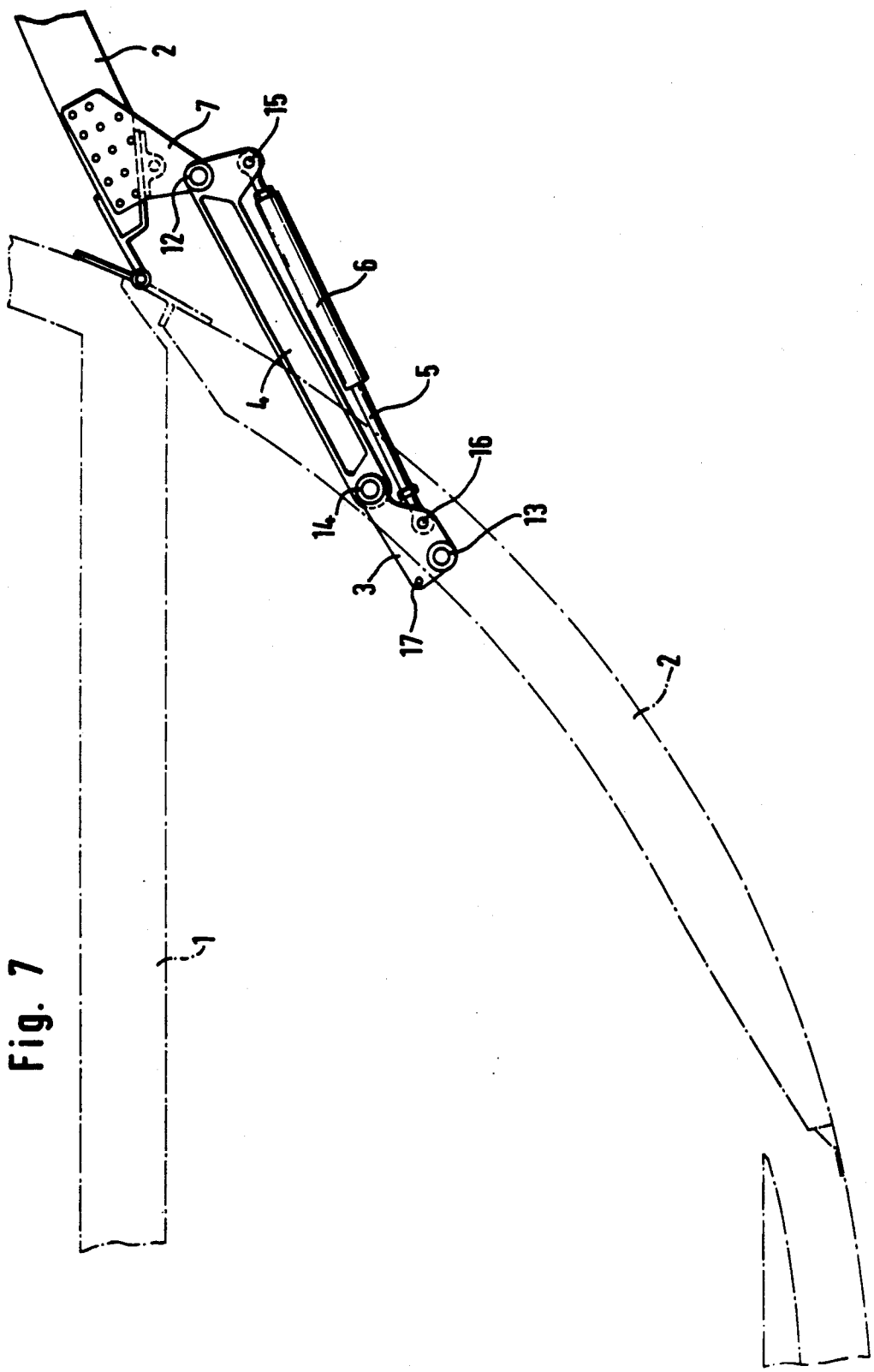

FIGS. 5,6,7 and 8 show in detail and by way of example the inventive door or hatch actuating structure. Here FIGS. 5,6,7 are cross sections through a portion of the fuselage in the area of the opening structure but with different opening positions of the hatch 2 while FIG. 8 illustrates a top view of the fuselage 1 with the door or hatch 2 and its opening and actuating structure. FIG. 8 specifically shows upstream/downstream redundancy of the coupling member 4, the rocking arm 3 and the spring 5/6.

The hatch or door 2 as shown in these figures is connected upstream as well as downstream on the upper side with at least one hinge joint 11 to the fuselage 1 (see FIG. 8). A connect piece 7 is provided at the upper end of one of the reinforcing elements for the door or hatch 2. This cover or connect piece 7 is floatingly connected to the swivel joint 12 at the upper end of the coupling member 4. The lower end of the coupling member 4 is connected through the swivel joint 13 to the rocking arm 3. The rocking arm 3 in turn is floatingly mounted through another swivel joint, 13, to a downframe support element 10 of the fuselage. The support element basically delineates the cargo's opening closed by the hatch or door 2.

The mandrel or plunger element 5 for the compression spring is also connected to the rocking arm 3 through another swivel joint 16. The sleeve 6 of the compression spring 5/6 is connected to the upper end of the coupling member 4 through another one of the swivel joints, namely 15. This sleeve 6 (and actually the entire spring) extends essentially parallel to the coupling member 4. For reasons of safety and security there is twofold redundancy as far as the opening mechanism is concerned. One being at the upstream side and the other one at the downstream end or side of the door or hatch.

The swivel joints 14, 15 and 16 are preferably provided with linkage mounts in order to balance and compensate any axial angle, errors. The spring being composed of the elements 5 and 6 is preferably constructed as a gas pressure spring because this kind of spring has a very favorable power to weight ratio and only a very moderate change in resiliency. Moreover the internal attenuation of such a spring will prevent in case of some failure occurrence of a high speed droping of the door and thus ensures better safety of the operating personnel and/or dispenses with the additional safety structures. Through a locking pin 17 the door or hatch 2 may be blocked and latched to the frame's element 10 to provide additional safety against undesired gate closing in case of a strong wind load.

The invention is not limited to the embodiments described above but all changes and modifications thereof, not constituting departures from the spirit and scope of the invention, are intended to be included.

We Claim:

1. Mechanically operable actuating device for opening towards the outside and closing a cargo hatch or freight door in the fuselage of an aircraft, comprising:

at least two hinges for connecting an upper side of the door or hatch to the fuselage;

a coupling member having an upper end and a lower end;

a first swivel joint for floatingly mounting the upper end of the coupling member to a re-enforcing part in the upper portion of the hatch or door;

a rocking arm;

a second swivel joint for floatingly connecting the rocking arm to a hatch or door frame of the fuselage;

a third swivel joint for connecting the rocking arm to the lower end of the coupling member;

a compression spring means;

a fourth swivel joint connecting one end of the spring means to the rocking arm so that the spring means extends substantially parallel to the coupling member; and a fifth swivel joint connecting an opposite end of the spring means to the upper end of the coupling member.

2. Device as in claim 1, said spring means being a gas pressure spring.

3. Device as in claim 1 including pin means for locking the rocking arm to the door frame.

4. Device as in claim 1, the fourth joint being between the second and the third joint.

5. Device as in claim 1 including upstream and downstream redundancy of the rocking arm, the spring means and the coupling member.

6. Mechanically operable actuating device for opening and closing a cargo hatch or freight door in the fuselage of an aircraft comprising:

hinge means for hinging the upper end of the door or hatch to a door/hatch frame of the fuselage;

a coupling member having its upper end swivally linked to the door/hatch;

a rocking arm with two end points and an in between point, one end point swivally linked to a low end of the member, and another end point swivally linked to the fuselage; and a spring means swivally linked to the upper end of the member and said in between joint, the spring means and the coupling member extending substantially parallel to each other.

* * * * *